United States Patent [19]
Hickman et al.

[11] 3,936,073
[45] Feb. 3, 1976

[54] TANDEM AXLE VEHICLE SPRING SUSPENSION

[75] Inventors: Albert F. Hickman, Eden, N.Y.; Robert G. Moore, Elkhart, Ind.

[73] Assignee: Hickman Developments, Inc., Eden, N.Y.

[22] Filed: Apr. 7, 1975

[21] Appl. No.: 565,422

[52] U.S. Cl............ 280/104.5 A; 267/33; 267/63 A
[51] Int. Cl.².......................................... B60G 11/52
[58] Field of Search.. 280/124 R, 104.5 R, 104.5 A, 280/104.5 B; 267/21 R, 33, 60, 63 A, 153, 166

[56] References Cited
UNITED STATES PATENTS

| | | | |
|---|---|---|---|
| 2,648,536 | 8/1953 | Udstad | 267/33 |
| 3,129,953 | 4/1964 | Hickman | 280/104.5 A |
| 3,301,573 | 1/1967 | Hickman | 280/104.5 R |

*Primary Examiner*—Philip Goodman
*Assistant Examiner*—John A. Carroll
*Attorney, Agent, or Firm*—Harold I. Popp

[57] ABSTRACT

In a friction-free vehicle suspension having axle ends pivotally connected by side walking beams, which are journalled on the ends of a cross rod, the improvement resides in the mounting, arrangement and proportioning of both helical compression springs and rectilinear movement shear rubber springs to support the vehicle frame on the ends of the cross rod. This is done in such manner as to achieve the maximum advantages from the distinctive characteristics of each type. The helical springs, which provide, in a very small space, a very large amount of resilient support, but no lateral control, are located inboard along the cross rod. The shear rubber springs are so mounted outboard along the cross rod to be fully effective in providing adequate resilient control of axle movement both laterally and longitudinally of the line of vehicle movement, as well as vertically, and also to provide high and wide stable spring centers for sidesway control. As a result in the very limited space available, a lighter, lower cost suspension is provided in which the ride characteristics can readily be adapted to the service without sacrifice of friction-free and full lateral sidesway control.

10 Claims, 7 Drawing Figures

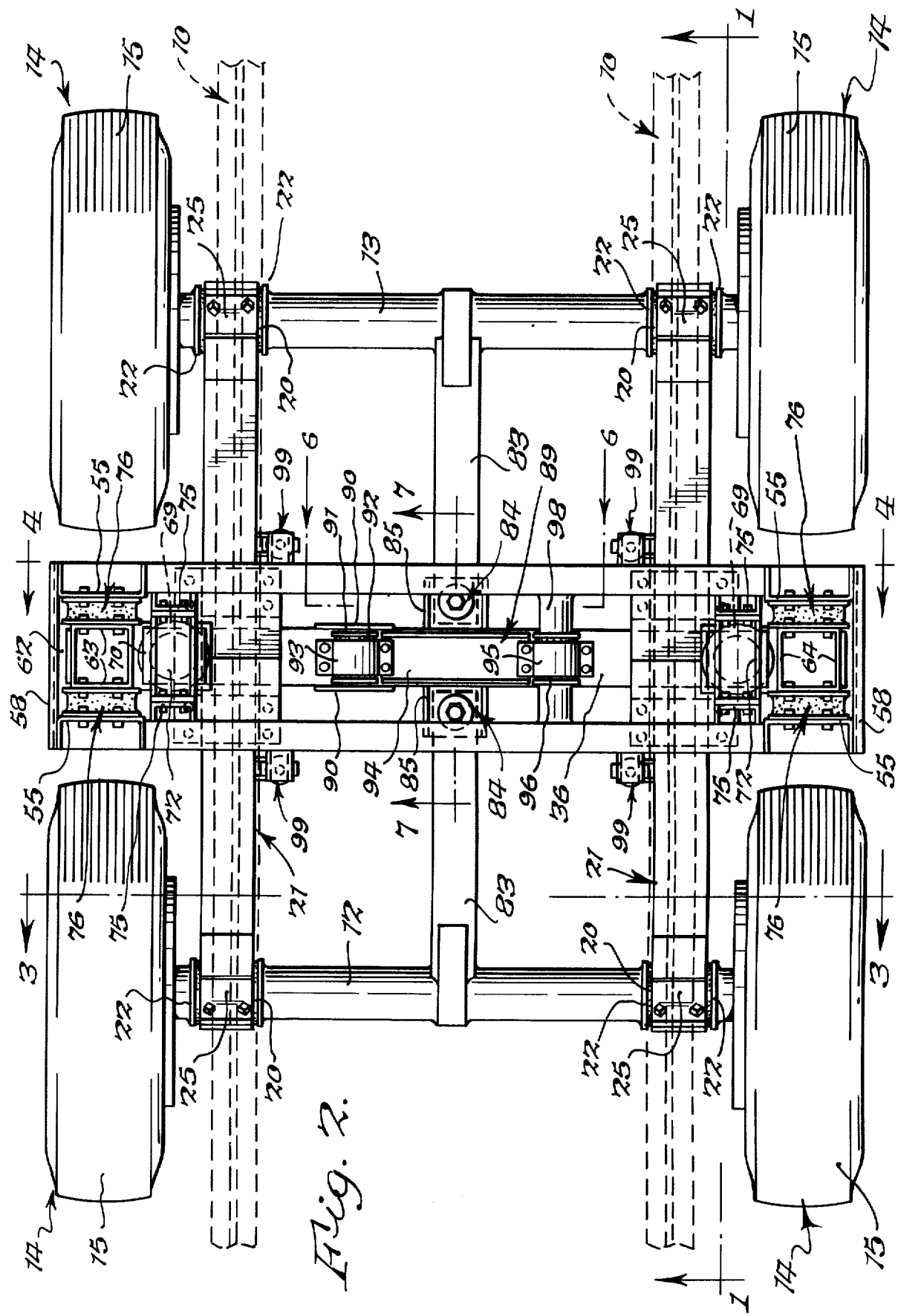

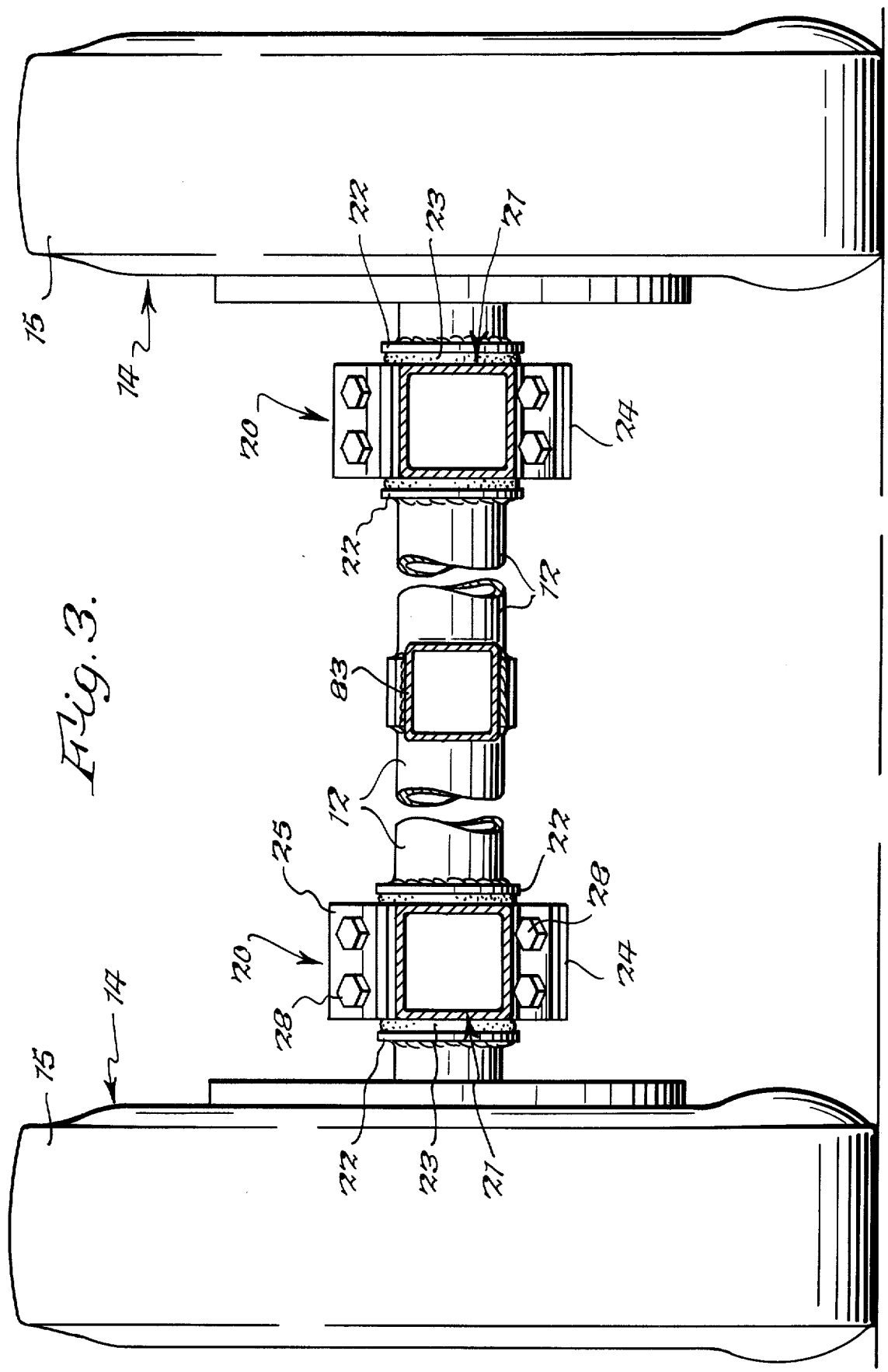

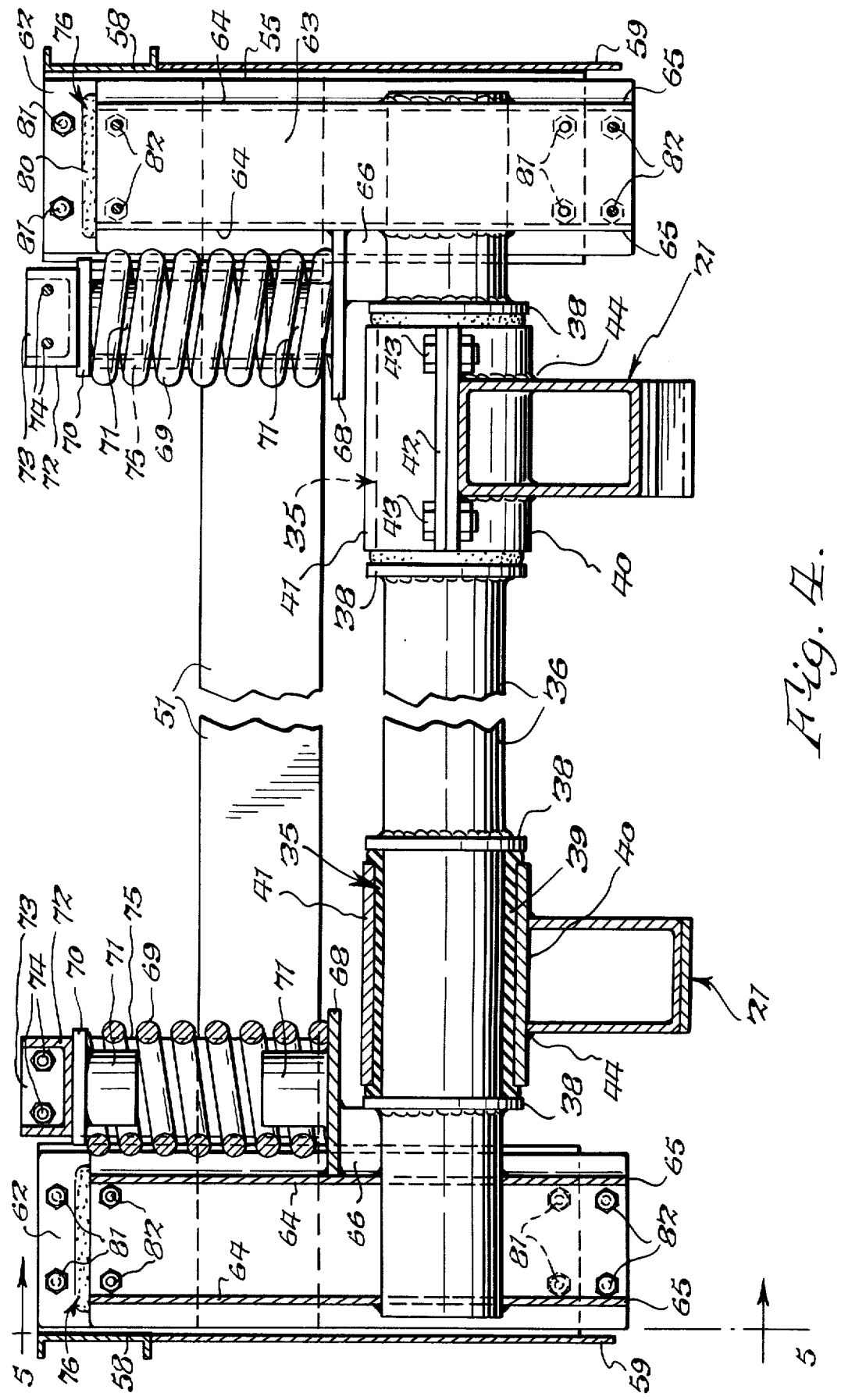

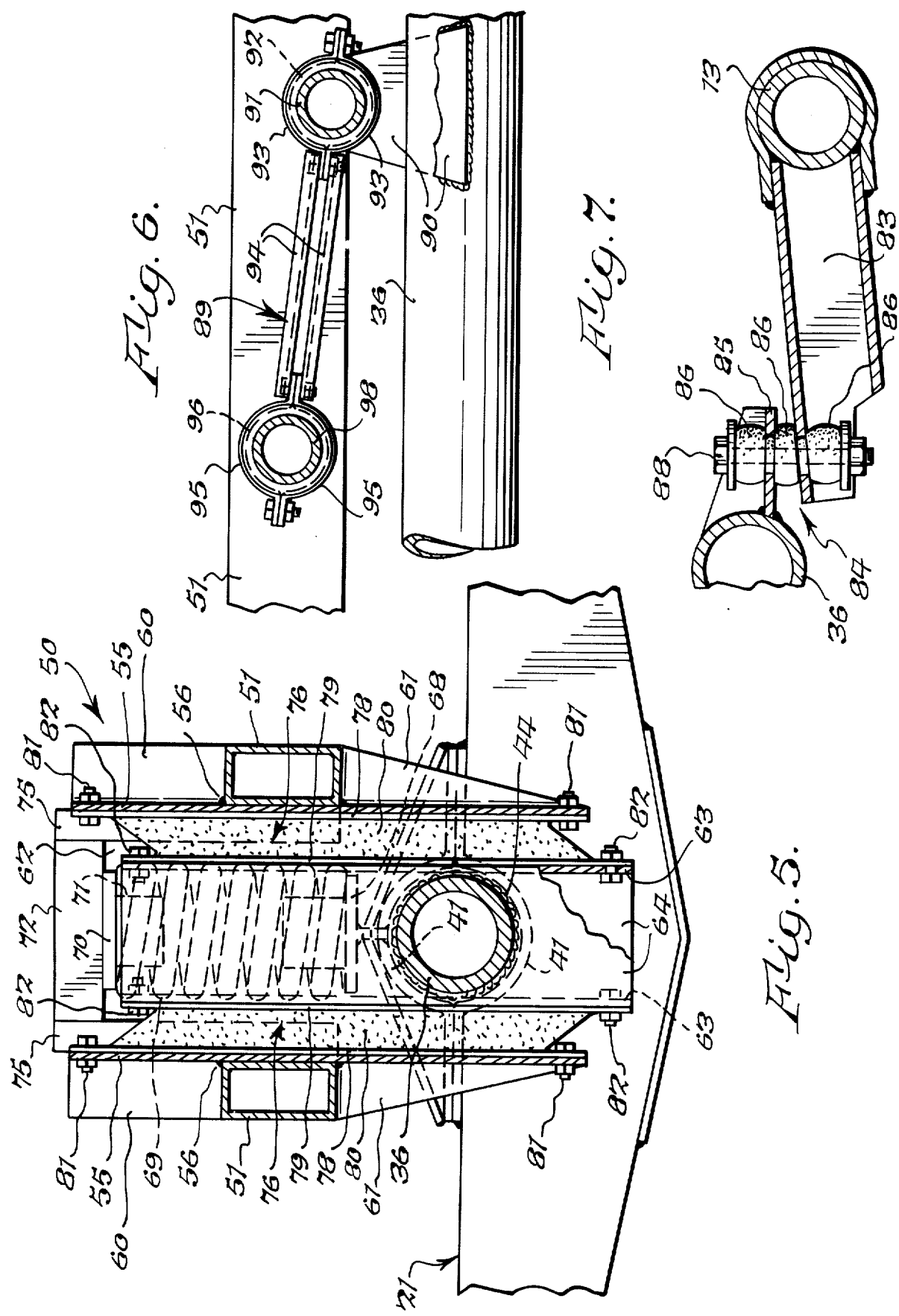

TANDEM AXLE VEHICLE SPRING SUSPENSION

An important object is to provide in a substantially friction-free heavy duty tandem axle suspension, the suspension illustrated being entirely friction-free, adequate lateral and sidesway control with fewer, lighter and more compact springs supporting shorter and lighter cross members, thereby to provide a suspension which is lighter in weight in both unsprung and sprung components.

Another object is to provide such a suspension which is of simplified construction and fully accessible.

Another object is to provide such a suspension which is materially less costly as compared with suspensions of comparable performance.

Another object is to provide such a suspension which will permit a large amount of vertical axle movement to provide a vertical ride as soft as load heights will allow and at a low frequency.

Another object is to provide such a suspension in which lateral and vertical movement of the unsprung components as well as slight movement thereof length of the line of vehicle travel are permitted and resiliently resisted, the lateral and vertical resilience being sufficient, both when the vehicle is loaded and unloaded, to absorb thrust of the axles laterally of the vehicle, particularly resulting from one wheel moving up and down with reference to the other, thereby to provide increased safety, tire wear, gasoline mileage and stability.

Another object is to provide such a tandem axle suspension which can have softer springs than those now on the market for equivalent duty and at the same time have greater sidesway control through high and wide spring mountings.

Another object is to provide such a suspension which can have many years and hundreds of thousands of miles of carefree operation without repairs or service.

Other objects and advantages of the invention will be apparent from the following description and drawings in which FIG. 1 is a fragmentary vertical section taken on line 1—1, FIG. 2 and showing the suspension embodying the present invention in side elevation, the opposite side of the suspension being identical in construction. The vehicle frame is shown in broken lines.

FIG. 2 is a fragmentary top plan view of the suspension embodying the present invention and again showing the main frame of a vehicle in broken lines.

FIGS. 3 and 4 are enlarged vertical transverse sections taken on the correspondingly numbered lines of FIG. 2.

FIG. 5 is a fragmentary vertical section taken on line 5—5, FIG. 4.

FIG. 6 is an enlarged fragmentary vertical section taken on line 6—6, FIG. 2.

FIG. 7 is a fragmentary vertical section taken on line 7—7, FIG. 2.

Figure 1:
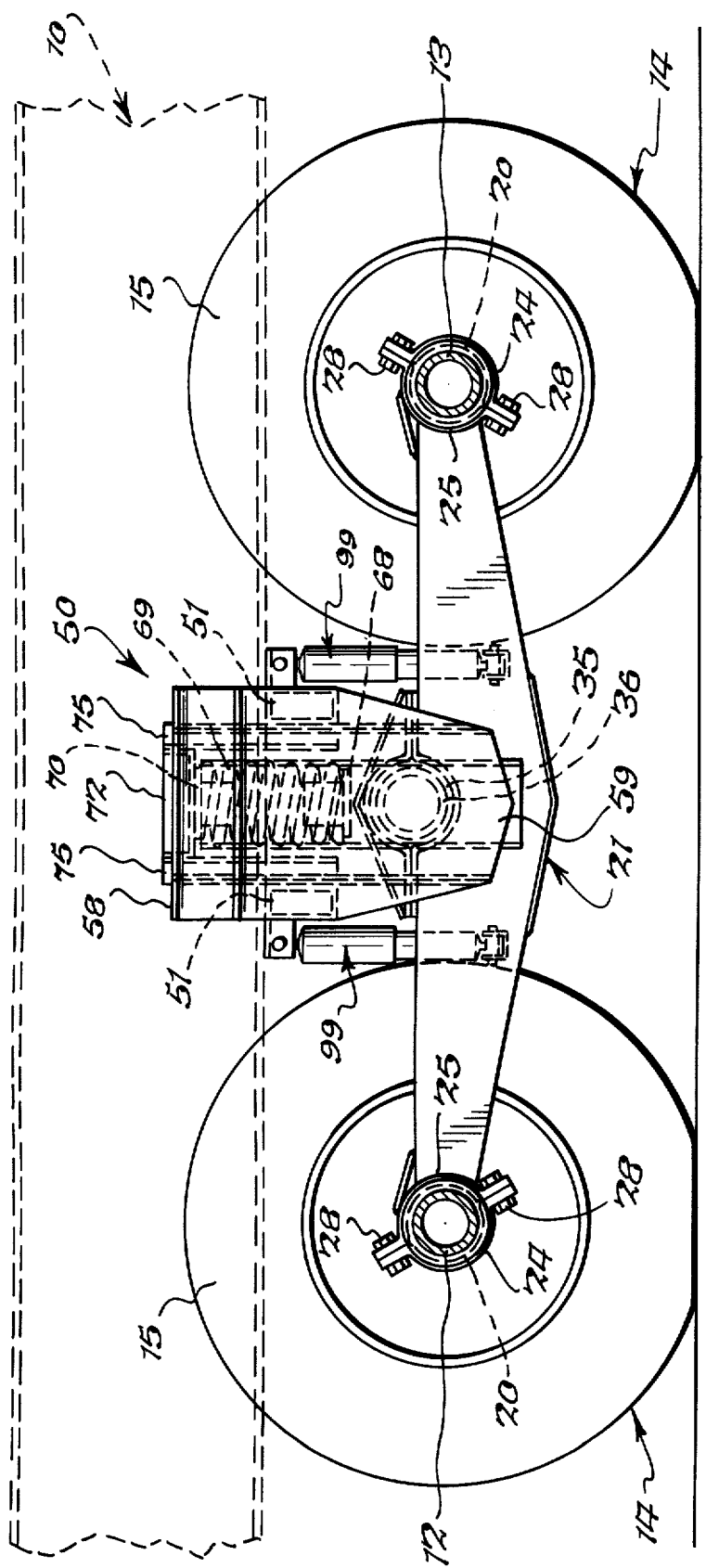

The invention is illustrated as being in the form of a tandem axle suspension adapted for a trailer, the main longitudinal side frame beams 10 being shown in broken lines in FIGS. 1 and 2. These main longitudinal side beams of the frame are shown as supported by a pair of tandem axles, the front tandem axle being designated at 12 and the rear tandem axle being designated at 13 and each of which in turn is supported at its opposite ends by wheels 14, these wheels being suitably secured on these axles and each including a rubber tire 15.

The construction of the tandem axle spring suspension at the right hand side of the frame is substantially the same as the construction at the left hand side of the frame and hence a description of the spring suspension at one side of the frame will be deemed to apply to both sides, the same reference numerals being employed.

Each end of each of the axles is connected by a rubber bushed bearing indicated generally at 20, to one end of a horizontal walking beam 21, these rubber bushed bearings being arranged adjacent the inner faces of the tires 15. Each walking beam 21 is arranged under a companion main longitudinal side frame beam 10 and is preferably of rectangular tubular form in cross section having vertical side walls connected by top and bottom walls. While each rubber bushed bearing 20 can be of any suitable construction, each is shown as comprising a pair of spaced end abutment rings 22 welded to each end of each axle and confining between them a rubber bushing 23 which embraces the axle. The bottom of the periphery of each rubber bushing is compressively embraced by a semicylindrical metal lower half bearing clamping member 24 and the top of the periphery of each rubber bushing is compressively embraced by a semicylindrical upper half bearing clamping member 25, these half bearing clamping members 24, 25 having outwardly projecting flanges along their opposite longitudinal edges and which flanges are secured together by bolts 28 so as to compress the rubber bushing 23 between the half bearing clamping members 24, 25. In order to accommodate the displacement of the rubber of the bushings, resulting from such compression, the semicircular end edges of these half bearing clamping members 24, 25 are in spaced relation to the abutment rings 22 welded to the axle end.

The upper half bearing clamping member 25 is welded to the corresponding end of the walking beam 21. Additionally, reinforcing plates 31 can be welded to the top of each upper half bearing clamping member 25 and to the top of the corresponding walking beam 21.

At its center, each walking beam 21 is connected by a rubber bushed bearing, indicated generally at 35, to a cylindrical cross rod in the form of a cylindrical tube 36.

While each rubber bushed bearing 35 can be of any suitable construction, as best shown in FIGS. 4 and 5, each comprises a pair of spaced end abutment rings 38 welded to each end of the cross rod 36 and confining between them a rubber bushing 39 which embraces the cross rod. The bottom of the periphery of each rubber bushing is compressively embraced by a semicylindrical metal lower half bearing clamping member 40 and the top of the periphery of each rubber bushing is compressively embraced by a semicylindrical upper half bearing clamping member 41, these half bearing clamping members 40, 41 having horizontally outwardly projecting flanges 42 along their opposite longitudinal edges and which flanges are secured together by bolts 43 so as to compress the rubber bushing 39 between the half bearing clamping members 41, 42. In order to accommodate the displacement of the rubber of the bushings 39 resulting from such compression, the opposite semicircular ends of the half bearing clamping members 40, 41 are in spaced relation to the abutment rings 38 welded to the cross tube end. Each lower half bearing clamping member 40 is set into and welded, as indicated at 44, to the center of its companion walking beam 21.

The opposite ends of the cross rod 36 resiliently support the opposite ends of a subframe structure, indicated generally at 50, which in turn is bolted or otherwise secured to the main longitudinal side frame bars 10 of the vehicle frame. This subframe structure comprises a pair of transversely spaced cross bars 51 which are preferably of rectangular tubular form in cross section, as best shown in FIG. 5, and arranged equidistant from and in a horizontal plane above the cross rod 36. These cross bars are removably connected to the main longitudinal side frame bars by frame brackets (not shown).

The invention is embodied in a combined helical or coil compression spring and rectilinear movement shear rubber spring connection between each end of the cross rod 36 and the cross bars 51 of the subframe structure 50. To this end, at each side of the trailer, a pair of upright, rectangular face plates 55 are welded, in opposing relation to each other, to the opposing faces of the cross bars 51, as indicated at 56, FIG. 5. To the upper ends of the outer vertical edges of each pair of these face plates 55 is welded a horizontal channel plate 58, the flanges of which project outwardly and the ends of which project beyond the face plates 55. Below each channel 58, a keystone-shaped upright face plate 59 is welded to the outer vertical edges of each pair of these plates 55, these keystone-shaped face plates covering the ends of the cross bars 51. Above each cross bar 51 an upright rectangular flange plate 60 projects outwardly from the edge of each face plate 55 closest to the vehicle frame and an upright triangular flange plate 61 projects outwardly therefrom below each cross bar 51.

Each set of plates 55-61 thereby forms a structure fixed to each pair of ends of the horizontal spaced cross bars 51 and forms a chamber 62 which is open at the side facing the vehicle frame and which houses the corresponding end of the cross rod 36. Within each chamber 62 a pair of upright rectangular plates 63 are welded to the opposite sides of the cross rod 36 in spaced, parallel relation to the upright face plates 55. These plates 63 are internally reinforced and connected together along their upright edges by an upper pair of upright cross plates 64 and a lower pair of upright cross plates 65.

Within each chamber 62 a small upright rectangular plate 66 is welded to and rises from the center of the cross rod 36 in line with its axis. Each plate 66 abuts and is welded to the adjacent plate 64 and abutment ring 38 of a rubber bushed bearing 35. Each plate 66 supports a horizontal pedestal plate 68 which in turn supports an upright helical compression spring 69. Each of these springs supports a top header or plate 70, and is retained in position by internal opposing tubular projections 71 from the pedestal 68 and header 70. Each header 70 support s a horizontal channel 72 having upright end walls 73 secured by bolts 74 to upright channels 75 which extend downwardly along the opposing faces of the cross bars 51 to which they are welded.

These helical compression springs provide friction-free resilient support for the cross bars 51 and vehicle frame bars 10 on the ends of the cross rod 36 but would not control horizontal movement of the vehicle frame on this cross rod. To provide such control and also greater resilient support for the frame on the axle, a rectilinear movement shear rubber spring 76 is interposed between the opposing faces of each face plate 55 and companion plate 63 welded to the end of the cross rod 36. Each shear rubber spring comprises a pair of rectangular metal plates 78, 79 to the opposing faces of which is vulcanized a rubber body 80 which is generally rectangular in planes parallel with these plates. Bolts 81, 82 secure the corners of the plates 78, 79, respectively, to the opposing faces of each pair of plates 55, 63.

The suspension is also shown as having torque arms 83 in the form of tubes which are square in cross section and each of which is welded at one end to the center of a corresponding axle 12, 13 to project horizontally toward the cross tube 36. Each is joined to this cross tube by a flexible joint 84. This joint can be of any suitable construction, being shown as comprising a horizontal ear 85 projecting radially from each side of the cross tube 36. This is flanked by a pair of torus or doughnut-shaped resilient rubber bodies 86. Each ear, its rubber bodies, the end of a corresponding torque arm 83, and a third resilient rubber torus body on the opposite side of the torque arm are penetrated and joined together by a bolt 88.

While not needed in regular single tractor trailer usage, a lateral radius rod 89 is desirable in the event the operator should couple two or more trailers in tandem. Such radius rod is centered over the axis of the cross tube 36 and joins it to the cross bars 51. To this end a pair of ears 90 are shown as welded to the fore-and-aft sides of the cross tube 36 to rise therefrom. These ears carry a tubular cross tube 91 bushed with a rubber bushing 92. This is compressed between two half bearing bushings 93. These are joined by a pair of links 94 to a similar pair of half bearing bushings 95 which compress a rubber bushing 96 around a tubular cross pin 98. This cross pin bridges the space between and is connected to the cross bars 51.

Suitable telescopic shock absorbers 99 can be interposed between each end of each cross bar 51 and the companion end of a walking beam 21, as best shown in FIGS. 1 and 2.

OPERATION

In the operation of the suspension the upward movement of one end of, say, the front tandem axle 12 through the corresponding rubber bushed bearing 20 effects upward movement of the forward end of the corresponding walking beam 21.

This upward movement of the forward end of this walking beam 21 raises its rock sleeve 40, 41 (FIGS. 1 and 4), and the corresponding end of the cross rod 36, at the center of the walking beam and which is journalled through the rubber bushing 39 on the corresponding end of the cross rod 36. This rubber bushing 39 is of sufficient radial thickness to permit the required rocking of the walking beam 21 and provides a frictionless bearing which is free from lubrication requirements. The two rubber bushings 39 hold the walking beams at the outer ends of the cross rod 36, but in the event of extreme horizontal lateral force against the vehicle body, as when two trailers are coupled together the radius rod 89 between the cross rod 36 and the cross bars 51 fixed to the vehicle frame provide a positive stop in the event of such extreme conditions.

This upward movement of one end of the cross rod 36 raises the corresponding pedestal 68 (FIG. 4) to distort upwardly its helical compression spring 69. This force is transmitted to the vehicle frame through the header 70, cross channel 72, upright channels 75 (FIG.

5) to the cross bars 51 secured to the vehicle frame 10.

This upward movement of one end of the cross rod 36 also raises the corresponding pair of upright plates 63 (FIG. 5) fixed to this end of the cross rod. This raises the upright side plates 79 of the rectilinear movement shear rubber springs 76 thereby to distort upwardly the opposing sides of the corresponding pair of rubber bodies 80. Accordingly this force is transmitted, via the upright face plates 78 of these springs, to the upright plates 55 and thence to the cross bars 51 secured to the vehicle frame. The rubber bodies 80 of these rectilinear movement shear rubber springs 76 are thereby also distorted to provide resilient support for the frame 10.

The rebound force of the helical compression springs 69 (FIG. 4) and of the rectilinear movement shear rubber springs 76 (FIG. 5), of course, restores the forward wheel to its original position and in this rebound action the corresponding shock absorber 99 is effective to retard such rebound action.

An important general feature of the suspension is that it is friction-free. Thus, the bearings are all thickly rubber bushed to permit friction-free wind-up and turning and the principal resilient support is provided by the friction-free helical compression springs 69 and shear rubber springs 76. Another important general feature is that adequate lateral control, particularly of sidesway and tipping, is provided by the high and wide pivot points provided by the shear rubber springs 76.

A specific feature of the invention is that such adequate lateral control, even with heavy duty trailers, is provided by a very large reduction in the size and/or number of such shear rubber springs 76. In the suspension as shown the shear rubber springs 76 are proportioned to provide less than about half of the resilient support for the frame, the balance being supplied by the helical compression springs 69 which, however, contribute nothing to lateral control.

Such adequate lateral control and adequate resilient support using both shear rubber and helical springs is achieved in a lighter, more compact and less expensive suspension as compared with a suspension employing only helical compression springs or shear rubber springs. This is achieved by utilizing and arranging the two types of springs to take full advantage of their distinctly different characteristics.

Thus, with steel helical compression springs 68, a great deal of resilient resistance can be put in a very small space as compared with rubber. Such helical compression springs obviously have no lateral control at all. However, a helical spring 69 of, say, 10,000 to 20,000 pounds capacity (to work with a companion pair of shear rubber springs 76 having, jointly, a 25,000 pound capacity) can be provided by a 6 inch outside diameter steel spring. Such a spring can be accommodated in a 6½ inch space, horizontally, between the fram 10 and each pair of shear rubber springs 69. This permits each pair of shear rubber springs 69 to be located within 6½ inches, horizontally, from the frame 10. This reduces (a) the length, size and weight of the pair of square cross tubes 51 which carry the load to the frame, (b) the length, size and weight of the cross tube 36 and (c) the size and weight of the frame bracket 52. A weight saving of 100 pounds or more can be made.

The helical compression springs 69 can provide support for up to about 50% of the loaded body. If they provide more support they reduce the lateral or horizontal control ability of the shear rubber springs 76 to less than 50% of their ability. Hence there is a limitation on how big a percentage of the overall load can be taken by the helical compression springs without harmful reduction of stability of the spring suspension.

It will be noted that such further inward location of the pairs of shear rubber springs 76 is achieved without sacrifice of stability. Of course closer arrangement of these shear rubber springs 76 results in narrower effective spring centers. However, the shear rubber springs 76 have been arranged higher, extending up to the horizontal plane of the tops of the tire treads. This raises the lateral control pivot points provided by the shear rubber springs 76 to increase the lateral and sidesway stability of the system thereby to permit the shear rubber springs 76 to be located further inboard, with shorter and lighter cross members, without sacrifice of lateral stability.

For heavy duty work, four shear rubber springs 76 were required at each side of the vehicle to carry the entire load. In the present suspension of single helical compression spring 69 replaced two such shear rubber springs at each side of the vehicle. This reduces the space required between each pair of wheels to permit shortening of each working beam 21 or to accommodate the shock absorbers 99.

As a substitute for the helical springs 69, compression rubber springs would be impracticable. They would necessarily be too massive horizontally and would not provide so good a ride as with the combination of constant rate shear rubber and metal coil springs of the present invention.

As previously indicated, the lateral control radius rod 89 is only needed to permit trouble-free hauling of two or more trailers in tandem. Their rubber bushings 92, 95 provide lateral resiliency in the suspension.

By "rubber" as used in the accompanying claims is meant natural rubber, synthetic rubber, or mixtures thereof, and by "wheels" is meant the ground engaging means 14, 15 whether in the form of the single wheels shown, or dual wheels. By "spring pivot points" is meant the generally horizontal axis, lengthwise of the line of vehicle travel, which each rubber body 80 tends to twist when its wheel 14 rises with reference to the opposite wheel. A feature of the suspension is that these spring pivot points are high and wide to provide adequate lateral control to reduce sidesway and the danger of tipover, as well as to reduce the vertical movement of each side of the vehicle with reference to the vertical movement of its wheel.

What is claimed is:

1. A tandem axle spring suspension adapted to be interposed between a vehicle frame and a pair of tandem axles having rubber tired wheels journalled at the ends thereof, having a walking beam arranged at each of said frame and extending lengthwise thereof close to the inner vertical faces of the corresponding pair of tires, a horizontal cross rod extending transversely of said frame toward the space between said tires at each side of said vehicle and with its ends arranged adjacent the central parts of said walking beams, a pair of bearings journalling said cross rod near the ends thereof on said central parts of said walking beams, and means movably connecting each end of each walking beam with a corresponding axle end wherein the improvement comprises means resiliently supporting opposite sides of said frame on the ends of said cross rod, comprising a pedestal mounted on each cross rod end adjacent the outboard part of the corresponding one of said bearings, a metal helical compression spring mounted on each pedestal, means supported on top of each metal helical compression spring and supporting the corresponding side of said frame, and means providing high and widely spaced spring pivot points for said frame on the opposite ends of said cross rod and also providing a large proportion of the resilient support for said frame on said cross rod in addition to said metal helical compression springs, comprising at least one upright first plate secured to each cross rod end outboard from the corresponding metal helical compression spring, a resilient rubber body fixed to one face of said upright plate, a second upright plate fixed to the opposite side of said flexible rubber body in generally parallel relation to said first plate, and means securing said second plate to said frame.

2. A tandem axle spring suspension as set forth in claim 1 wherein a part of each bearing is arranged below the corresponding metal helical compression spring.

3. A tandem axle spring suspension as set forth in claim 1 wherein each pedestal comprises a plate arranged directly above and fixed to the corresponding axle end.

4. A tandem axle spring suspension as set forth in claim 3 wherein each pedestal plate projects over the corresponding bearing.

5. A tandem axle spring suspension as set forth in claim 1 wherein said means supported on top of each metal helical compression spring and supporting the corresponding side of said frame comprises a horizontal cross member engaging the top of each metal helical compression spring, a pair of upright members secured at their upper ends to each horizontal member and extending downwardly in closely spaced relation to the fore-and-aft sides of the corresponding metal helical compression spring, and means securing the lower parts of said upright members to said frame.

6. A tandem axle spring suspension as set forth in claim 5 wherein said last named means comprises the corresponding ends of a pair of spaced horizontal cross bars adapted to be secured to said frame with their ends projecting from the opposite sides of the frame.

7. A tandem axle spring suspension as set forth in claim 6 wherein extensions of said ends of said pair of spaced horizontal cross bars comprise a part of said means securing said second metal plate to said frame.

8. A tandem axle spring suspension as set forth in claim 1 wherein two of said upright first plates are provided and are secured to opposite sides of each cross rod end in generally parallel relation to the axis thereof.

9. A tandem axle spring suspension as set forth in claim 1 wherein said resilient rubber bodies provide at least half the resilient support for said frame on said cross rod.

10. A tandem axle spring suspension adapted to be interposed between a vehicle frame and a pair of tandem axles having rubber tired wheels journalled at the ends thereof, and having a walking beam arranged at each side of said frame and extending lengthwise thereof close to the inner vertical faces of the corresponding pair of tires, a horizontal cross rod extending transversely of said frame into the space between said tires at each side of said vehicle and with its ends arranged adjacent the central parts of said walking beams, a bearing journalling said cross rod near each end thereof on said central parts of said walking beams, and means movably connecting each end of each walking beam with the corresponding axle end, wherein the improvement comprises means resiliently supporting opposite sides of said frame on the ends of said cross rod, comprising a pair of spaced horizontal cross bars adapted to be secured to said frame, fore-and-aft of said cross rod, with their ends projecting from opposite sides of said frame, a pedestal carried by each cross rod end adjacent the outboard part of the corresponding one of said bearings, a metal helical compression spring mounted on each pedestal, a horizontal cross member engaging the top of each metal helical compression spring, a pair of upright members secured to each horizontal cross member and extending downwardly fore-and-aft of the corresponding metal helical compression spring, means securing the lower parts of said upright members to the corresponding ends of said cross bars, and means providing high and widely spaced spring pivot points for said frame on the opposite ends of said cross rod and also providing a large proportion of the resilient support for said frame on said cross rod in addition to said metal helical compression springs, comprsing a pair of upright plates fixed to the fore-and-aft sides of each cross rod end to have upright faces facing forwardly and rearwardly away from the cross rod, a rubber body secured at one side to each of said last named upright faces, and means connecting the opposite side of each rubber body to the corresponding cross bar end, said rubber bodies being distorted in upright rectilinear shear to provide at least half the resilient support for said frame on said cross rod.

* * * * *